United States Patent
Chen et al.

(10) Patent No.: US 9,191,312 B2
(45) Date of Patent: Nov. 17, 2015

(54) METHOD AND SYSTEM FOR IMPLEMENTING PW CONTROL BIT CAPABILITY NEGOTIATION

(75) Inventors: Ran Chen, Shenzhen (CN); Lizhong Jin, Shenzhen (CN); Yubao Wang, Shenzhen (CN); Chun Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 238 days.

(21) Appl. No.: 13/880,496

(22) PCT Filed: Aug. 16, 2011

(86) PCT No.: PCT/CN2011/078480
§ 371 (c)(1),
(2), (4) Date: Apr. 19, 2013

(87) PCT Pub. No.: WO2012/051880
PCT Pub. Date: Apr. 26, 2012

(65) Prior Publication Data
US 2013/0286890 A1    Oct. 31, 2013

(30) Foreign Application Priority Data
Oct. 22, 2010   (CN) .......................... 2010 1 0518146

(51) Int. Cl.
*H04L 12/721*   (2013.01)
*H04L 12/701*   (2013.01)
*H04L 12/46*    (2006.01)

(52) U.S. Cl.
CPC ................ *H04L 45/68* (2013.01); *H04L 45/00* (2013.01); *H04L 12/4633* (2013.01)

(58) Field of Classification Search
CPC ......... H04L 45/00; H04L 45/04; H04L 45/10; H04L 45/50; H04L 45/68; H04L 12/4633

USPC .................................. 370/252, 254, 392, 401
See application file for complete search history.

(56) References Cited

U.S. PATENT DOCUMENTS 7,822,054 B2 * 10/2010 Li ................................. 370/419
8,619,635 B2 * 12/2013 Kini ........................ H04L 45/66
                                                            370/255

(Continued)

FOREIGN PATENT DOCUMENTS

CN     101262424 A     9/2008
CN     101552711 A    10/2009

(Continued)

OTHER PUBLICATIONS

RFC 4447—Pseudowire Setup and Maintenance Using the Label Distribution Protocol; Apr. 2006 by L. Martini , 33 pages.*

(Continued)

*Primary Examiner* — Xavier S Wong
(74) *Attorney, Agent, or Firm* — Sutherland Asbill & Brennan LLP

(57) ABSTRACT

A method and system for implementing a pseudo wire control word capability negotiation are disclosed in the present document. The method includes: when modifying a local control word value, a Provider Edge (PE) acquiring a control word value configured or negotiated locally by an opposite terminal provider edge by sending label request message and receiving label mapping message, and according to the local control word value and the acquired control word value, the provider edge determining a control word value negotiated with respect to a pseudo wire. In the present document, the problem of inconsistency between the control word configurations and the expected negotiation results existing in certain specific scenarios is solved, which enhances the negotiation performance. The technical scheme of the present document makes slight modifications on the existing protocol, and it is applicable to a single segment pseudo wire scenario and a multiple segment pseudo wire scenario.

16 Claims, 6 Drawing Sheets

(56) References Cited

U.S. PATENT DOCUMENTS

| | | | |
|---|---|---|---|
| 2008/0151895 A1* | 6/2008 | Krzanowski | 370/392 |
| 2008/0270580 A1* | 10/2008 | Lange | H04L 12/2856 709/220 |
| 2008/0279110 A1* | 11/2008 | Hart | H04L 12/2697 370/248 |
| 2009/0285089 A1* | 11/2009 | Srinivasan | H04L 12/4633 370/218 |
| 2011/0286462 A1* | 11/2011 | Kompella | H04L 45/18 370/395.53 |
| 2012/0008622 A1* | 1/2012 | Cao et al. | 370/389 |
| 2012/0300783 A1* | 11/2012 | Chen | H04L 41/12 370/395.5 |

FOREIGN PATENT DOCUMENTS

| | | |
|---|---|---|
| CN | 101631069 A | 1/2010 |
| EP | 2299637 A1 * | 3/2011 |
| WO | WO2010006528 * | 1/2010 |

OTHER PUBLICATIONS

PCT International Search Report for PCT/CN2011/078480 mailed Nov. 24, 2011 (4 pages).

* cited by examiner

METHOD AND SYSTEM FOR IMPLEMENTING PW CONTROL BIT CAPABILITY NEGOTIATION

CROSS REFERENCE TO RELATED APPLICATIONS

This application claims the priority benefit of PCT/CN2011/078480 filed on Aug. 16, 2011 and Chinese Application No. 201010518146.7 filed on Oct. 22, 2010. The contents of these applications are hereby incorporated by reference in their entirety.

TECHNICAL FIELD

The present document relates to a technique of the pseudo wire control word negotiation, and particularly, to a method and system for negotiating a pseudo wire control word capability.

BACKGROUND OF THE RELATED ART

The expansibility, upgrade and compatible intercommunication capability of a rapid developed IP network are very strong, and flexibilities of the upgrade, expansibility and intercommunication of a traditional communication network are comparatively poor and they are limited by the transmission modes and service types, and the universality of newly established networks is also relatively poor, which is inappropriate for intercommunication management. Therefore, in the process of the traditional communication network facing the upgrade and application expansion, it is considered whether to establish repetitive networks respectively or to fully utilize the existing or common resources to achieve the object of network upgrade and application expansion, and how to be able to achieve this object is a problem considered by all the skilled in the art.

The Pseudo Wire (PW) technology is a solution proposed with respect to a converged communication network in the future, and it is a technology of providing imitated traditional 1 layer and 2 layer network services based on a packet switched network. The pseudo wire technology is almost applied to all networks, which enables the Multi-Protocol Label Switch (MPLS) technology to implement a real convergence of access network and metropolitan area network. A pseudo wire is a point-to-point connection between Provider Edge (PE) nodes, an establishment mechanism of the pseudo wire is defined in the RFC4447 of Internet Engineering Task Force (IETF), the pseudo wire is established by using a Label Distribute Protocol (LDP) as a signaling mechanism, and label switching and parameter negotiations of the pseudo wire are performed. Wherein, a control word negotiation is only one of the pseudo wire parameter negotiations, only when Control words (C-Bit) in LDP mapping message mutually announced by two Provider Edges (PE) establishing the pseudo wire are consistent, the control words of the pseudo wire can be negotiated successfully, and only when each control word in the LDP mapping message mutually announced is 1, it can be negotiated that the PW supports the control words. All the ultimate negotiation results in other situations are that the PW does not support the control words (refer to the RFC4447 protocol for the specific control word negotiation rules).

FIG. 1 is schematic diagram of a network of the Single Segment Pseudo Wire (SS-PW) control word negotiation in the related art, a PE1 and a PE2 will have the problem of inconsistency between negotiation results and configurations in the following scenario. The following steps are specifically included.

In step 101, the PE2 configures that the PW does not support a control word in local, and sends label mapping message carrying a C-Bit of 0 to the PE1.

In step 102, the PE1 configures that the PW supports the control word in local and sends label mapping message carrying a C-Bit of 0 to the PE2.

An operating way in this step is determined according to the RFC4447, and the RFC4447 formulates that, if the C-Bit in the label mapping message firstly sent by an opposite terminal to a current terminal is 0, it is indicated that the opposite terminal does not support the control word, and no matter whether a local configuration supports the control word or not subsequently, the label mapping message with the C-Bit of 0 is still announced to the opposite terminal.

In step 103, the PE1 makes a successful local negotiation with respect to the PW, and the control word negotiation result is a way of not supporting.

In step 104, the PE2 receives the label mapping message carrying the C-Bit of 0 announced by the opposite terminal, a local negotiation with respect to the PW is successful, and the negotiation result is a way of not supporting.

At the point, two terminals of the PW make a successful negotiation, and the control word negotiation result is a way of not supporting, which is represented as NegoCbit=0.

In step 105, a local configuration of the PE2 is deleted, a local pseudo wire is canceled, and label cancel message is sent to the PE1.

In step 106, the PE1 cancels the pseudo wire after receiving the label cancel message of the PE2, and replies label release message to the PE2.

At the point, the PW is canceled, and a control word negotiation result is unknown, which is represented as NegoCbit=X.

In step 107, the PE2 reconfigures that the PW locally supports the control word, and sends the label mapping message carrying the C-Bit of 0 to the PE1.

Since the PE2 receives the label mapping message carrying the C-Bit of 0 sent by the PE1 in the step 104, according to the provision in the RFC4447 that, if the C-Bit in the label mapping message firstly sent by the opposite terminal to the current terminal is 0, it is indicated that the opposite terminal does not support the control word, and no matter whether a local configuration supports the control word or not subsequently, the label mapping message with the C-Bit of 0 is still announced to the opposite terminal, even though the PE2 configures that the PW supports the control word in local, it still sends the label mapping message carrying the C-Bit of 0 to the PE1.

In step 108, the PE2 makes a successful local negotiation with respect to the PW, and the control word negotiation result is a way of not supporting.

In step 109, after receiving the label mapping message carrying the C-Bit of 0 announced from the PE2, the PE1 makes a successful local negotiation with respect to the PW, and the control word negotiation result is a way of not supporting.

Ultimately, two terminals of the PW make a successful negotiation, and the control word negotiation result is a way of not supporting.

It can be seen from the description of the above negotiation process that, in this timing sequence scenario, when the PE2 modifies the local control word configuration properties (that is, not supporting is modified as supporting) in step 107, according to the C-Bit of 0 in the mapping message announced by the PE1 to the PE2 previously, the PE2 judges that the PE1 is in the way of not supporting the control word (but actually the PE1 supports the control word), and consequently carries the C-Bit of 0 in the label mapping message announced to the opposite terminal, thus eventually resulting in that the local configurations of the PE1 and PE2 are all in the way of supporting the control words, but they still do not support the control words according to the existing negotiation results, which causes the inconsistency between the configurations and the expected negotiation results.

FIG. 2 is schematic diagram of a network of the Multiple Segment Pseudo Wire (MS-PW) control word negotiation in the related art, a pseudo wire Terminating PE (T-PE) and a pseudo wire Switching PE (S-PE) are included, a T-PE1 and a T-PE3 will have the problem of inconsistency between negotiation results and configurations in the following scenario. The following steps are specifically included.

In step 201, the T-PE3 configures that the PW does not support a control word in local, and sends label mapping message carrying a C-Bit of 0 to the S-PE2, the S-PE2 configures that the PW supports the control word in local, but the S-PE2 sends the label mapping message carrying the C-Bit of 0 to the T-PE1.

In step 202, the T-PE1 configures that the PW supports the control word in local, but sends the label mapping message carrying the C-Bit of 0 to the S-PE2, and the S-PE2 sends the label mapping message carrying the C-Bit of 0 to the T-PE3.

An operating way of this step is determined according to the RFC4447, and the RFC4447 formulates that, if the C-Bit in the label mapping message firstly sent by an opposite terminal to a current terminal is 0, it is indicated that the opposite terminal does not support the control word, and no matter whether a local configuration supports the control word or not subsequently, the label mapping message with the C-Bit of 0 is still announced to the opposite terminal. Therefore, in this step, the T-PE1 sends the label mapping message carrying the C-Bit of 0 to the S-PE2.

In step 203, the T-PE1 makes a successful local negotiation with respect to the PW, and the control word negotiation result is a way of not supporting.

In step 204, the T-PE3 receives the label mapping message carrying the C-Bit of 0 announced by the opposite terminal, a local negotiation with respect to the PW is successful, and the negotiation result is a way of not supporting.

At the point, two terminals of the PW make a successful negotiation, and the control word negotiation result is a way of not supporting, which is represented as NegoCbit=0.

In step 205, a local configuration of the T-PE3 is deleted, a local pseudo wire is canceled, label cancel message is sent to the S-PE2, and the S-PE2 sends the label cancel message to the T-PE1.

In step 206, the S-PE2 receives the label cancel message of the T-PE3 and replies a label release message to the T-PE3, and the S-PE2 continues to send the label cancel message to the T-PE1.

In step 207, the T-PE1 receives the label cancel message of the S-PE2 and replies the label release message to the S-PE2.

At the point, the negotiation with respect to the PW is canceled, and a control word negotiation result is unknown, which is represented as NegoCbit=X.

In step 208, the T-PE3 reconfigures that the PW locally supports the control word, and sends the label mapping message carrying the C-Bit of 0 to the T-PE1 via the S-PE2.

In step 209, the T-PE3 makes a successful local negotiation with respect to the PW, and the control word negotiation result is a way of not supporting.

In step 210, after receiving the label mapping message carrying the C-Bit of 0, the T-PE1 makes a successful local negotiation with respect to the PW, and the control word negotiation result is a way of not supporting.

Ultimately, two terminals of the PW make a successful negotiation, and the control word negotiation result is a way of not supporting.

The above multiple segment pseudo wire negotiation process has the same problem as that in the single segment pseudo wire negotiation process, as shown in FIG. 2, at first, the local control word configuration ways of the T-PE1, S-PE2 and T-PE3 are respectively: supporting control word, supporting control word, and not supporting control word. when the T-PE3 modifies the local control word configuration properties (that is, not supporting is modified as supporting), according to the C-Bit of 0 in the mapping message announced by the S-PE2 to the T-PE3 previously, the T-PE3 judges that the S-PE2 is in the way of not supporting the control word (but actually the S-PE2 supports the control word), and consequently carries the C-Bit of 0 in the label mapping message announced to the opposite terminal, thus eventually resulting in that the local configurations of the T-PE1, S-PE2 and T-PE3 are all in the way of supporting the control words, but they still do not support the control words according to the existing negotiation results, which causes the inconsistency between the configurations and the expected negotiation results.

SUMMARY OF THE INVENTION

The technical problem required to be solved by the present document is to provide a method and system for implementing pseudo wire control word capability negotiation, which solves the problem of inconsistency between the control word configurations and the expected negotiation results in a control word negotiation process, and enhances the negotiation performance.

In order to solve the above technical problem, a method for implementing pseudo wire control word capability negotiation is provided, which comprises:

when modifying a local control word value of a pseudo wire, a Provider Edge (PE) acquiring a control word value configured or negotiated locally by an opposite terminal provider edge by sending label request message and receiving label mapping message, and according to a locally configured control word value and the acquired control word value, the provider edge determining a control word value negotiated with respect to the pseudo wire.

Wherein, the step of, when modifying a local control word value of a pseudo wire, a provider edge acquiring a control word value configured by an opposite terminal provider edge by sending label request message and receiving label mapping message comprises any one of following ways:

a way 1, when modifying the local control word value of the pseudo wire, the provider edge sending label request message to the opposite terminal provider edge, and after receiving the label request message, the opposite terminal provider edge sending label mapping message carrying a locally configured control word value to the provider edge;

a way 2, when modifying the local control word value of the pseudo wire, the provider edge firstly sending label mapping message carrying a locally configured control word value to the opposite terminal provider edge, and then sending label request message to the opposite terminal provider edge, and after receiving the label request message, the opposite terminal provider edge sending label mapping message carrying a locally negotiated control word value to the provider edge.

The method further comprises: in the way 1, after determining the control word value negotiated with respect to the pseudo wire, the provider edge sending label mapping message to the opposite terminal provider edge, and carrying a control word value locally negotiated by the provider edge in the label mapping message.

The method further comprises: according to the control word value configured by the current terminal and the control word value carried in the received label mapping message sent by the provider edge, the opposite terminal provider edge determining the control word value negotiated with respect to the pseudo wire, and completing a pseudo wire control word negotiation process.

Wherein, an operation of the provider edge modifying the local control word value of the pseudo wire triggering an operation of sending the label request message to the opposite terminal provider edge subsequently is irrelevant to whether the provider edge has received the label mapping message sent by the opposite terminal provider edge or not.

The method further comprises: in a multiple segment pseudo wire negotiation process, after receiving label request message sent by the provider edge at a terminal, a pseudo wire switching provider edge sending the label request message to the provider edge at another terminal.

A system for implementing pseudo wire control word capability negotiation is further provided, which comprises: a Provider Edge (PE) and an opposite terminal provider edge, wherein, the provider edge is configured to: when modifying a local control word value of a pseudo wire, acquire a control word value configured or negotiated locally by the opposite terminal provider edge by sending label request message and receiving label mapping message, and according to the local control word value and the acquired control word value, determine a control word value negotiated with respect to the pseudo wire.

Wherein, the provider edge is further configured to: when modifying the local control word value of the pseudo wire, send label request message to the opposite terminal provider edge in a pseudo wire negotiation process;

the opposite terminal provider edge is configured to: after receiving the label request message, send label mapping message carrying a locally configured control word value to the provider edge, wherein, the control word value in the label mapping message only depends on a control word value locally configured by the opposite terminal provider edge.

Wherein, the provider edge is further configured to: when modifying the local control word value of the pseudo wire, firstly send label mapping message carrying a locally configured control word value to the opposite terminal provider edge in the pseudo wire negotiation process, and then send label request message to the opposite terminal provider edge.

the opposite terminal provider edge is configured to: after receiving the label request message, sending label mapping message carrying a locally negotiated control word value to the provider edge, wherein, the control word value in the label mapping message only depends on a control word value locally negotiated by the opposite terminal provider edge.

Wherein, the provider edge is further configured to: after determining a control word value locally negotiated with respect to the pseudo wire, send label mapping message to the opposite terminal provider edge, and carry a control word value locally negotiated by the provider edge in the label mapping message.

Wherein, the opposite terminal provider edge is further configured to: according to the control word value configured by the current terminal and the control word value carried in the received label mapping message sent by the provider edge, determine the control word value negotiated with respect to the pseudo wire, and complete a pseudo wire control word negotiation process.

The system further comprises a pseudo wire switching provider edge, wherein, the pseudo wire switching provider edge is configured to: after receiving label request message sent by the provider edge at a terminal, send the label request message to the provider edge at another terminal.

A Provider Edge (PE) is further provided, which comprises: a label request message sending module, a label mapping message receiving module and a control word value determination module, wherein:

when modifying a local control word value of a pseudo wire, by the label request message sending module sending label request message and the label mapping message receiving module receiving label mapping message, the provider edge acquires a control word value configured by an opposite terminal provider edge or negotiated by an opposite terminal provider edge with respect to the pseudo wire in a pseudo wire negotiation process;

the control word value determination module is configured to: according to a local control word value of the provider edge and the acquired control word value, determine the control word value negotiated with respect to the pseudo wire.

Wherein, the label request message sending module is further configured to: when modifying the local control word value of the pseudo wire, send label request message to the opposite terminal provider edge in the pseudo wire negotiation process;

the label mapping message receiving module is further configured to: receive label mapping message carrying a locally configured control word value sent by the opposite terminal provider edge in the pseudo wire negotiation process, wherein, the control word value in the label mapping message only depends on a control word value locally configured by the opposite terminal provider edge in the pseudo wire negotiation process.

The provider edge further comprises a label mapping message sending module, the label mapping message sending module is configured to: after determining a control word value locally negotiated by the provider edge with respect to the pseudo wire, send label mapping message to the opposite terminal provider edge in the pseudo wire negotiation process, and carry the control word value negotiated by the provider edge with respect to the pseudo wire in the label mapping message.

The provider edge further comprises a label mapping message sending module, wherein:

the label mapping message sending module is configured to: when modifying the local control word value of the pseudo wire, send label mapping message carrying a locally configured control word value to the opposite terminal provider edge in the pseudo wire negotiation process;

the label request message sending module is further configured to: after the label mapping message sending module sends the label mapping message carrying the locally configured control word value to the opposite terminal provider edge in the pseudo wire negotiation process, send label request message to the opposite terminal provider edge in the pseudo wire negotiation process;

the label mapping message receiving module is further configured to: receive the label mapping message carrying the locally negotiated control word value sent by the opposite terminal provider edge in the pseudo wire negotiation process, wherein, the control word value in the label mapping message only depends on a control word value negotiated by the opposite terminal provider edge with respect to the pseudo wire in the pseudo wire negotiation process.

A Provider Edge (PE) is further provided, and the provider edge comprises: a label mapping message receiving module and a control word value determination module, wherein:

the label mapping message receiving module is configured to: receive label mapping message sent by an opposite terminal provider edge in a pseudo wire negotiation process, and the label mapping message carries a control word value locally configured by an opposite terminal provider edge or negotiated by an opposite terminal provider edge with respect to the pseudo wire in the pseudo wire negotiation process;

the control word value determination module is configured to: determine the control word value negotiated with respect to the pseudo wire according to a locally configured control word value and a received control word value.

The provider edge further comprises: a label request message receiving module and a label mapping message sending module, wherein:

the label request message receiving module is configured to: receive label request message sent by the opposite terminal provider edge in the pseudo wire negotiation process when modifying a local control word value of a pseudo wire;

the label mapping message sending module is configured to: after the label request message receiving module receives the label request message, send label mapping message carrying the locally configured control word value to the opposite terminal provider edge in the pseudo wire negotiation process, wherein, the control word value in the label mapping message only depends on a control word value locally configured by the provider edge.

The provider edge further comprises: a label request message receiving module and a label mapping message sending module, wherein:

the label request message receiving module is configured to: receive label request message sent by the opposite terminal provider edge in the pseudo wire negotiation process;

the label mapping message sending module is configured to: after the label request message receiving module receives the label request message, send label mapping message carrying a control word value negotiated with respect to the pseudo wire to the opposite terminal provider edge in the pseudo wire negotiation process, wherein, the control word value in the label mapping message only depends on a control word value negotiated by the provider edge with respect to the pseudo wire.

In the present document, the problem of inconsistency between the control word configurations and the expected negotiation results existing in certain specific scenarios is solved, which enhances the negotiation performance. The technical scheme of the present document is easy to implement, it makes slight modifications on the existing protocol, and it is applicable to a single segment pseudo wire scenario and a multiple segment pseudo wire scenario, which has lower implementation costs.

PREFERRED EMBODIMENTS OF THE INVENTION

Figure 1:
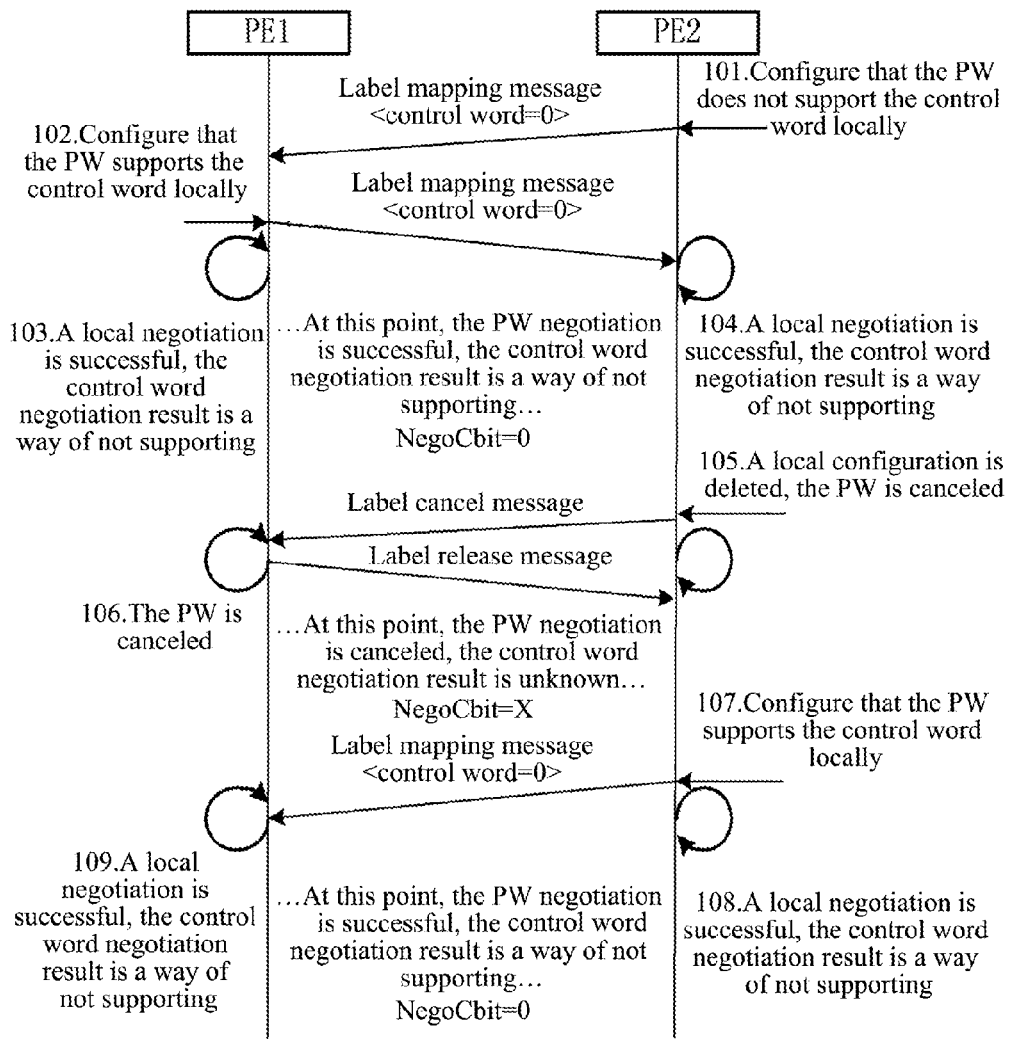
FIG. 1 is a schematic diagram of a network of the single segment pseudo wire control word negotiation in the related art.
Figure 2:
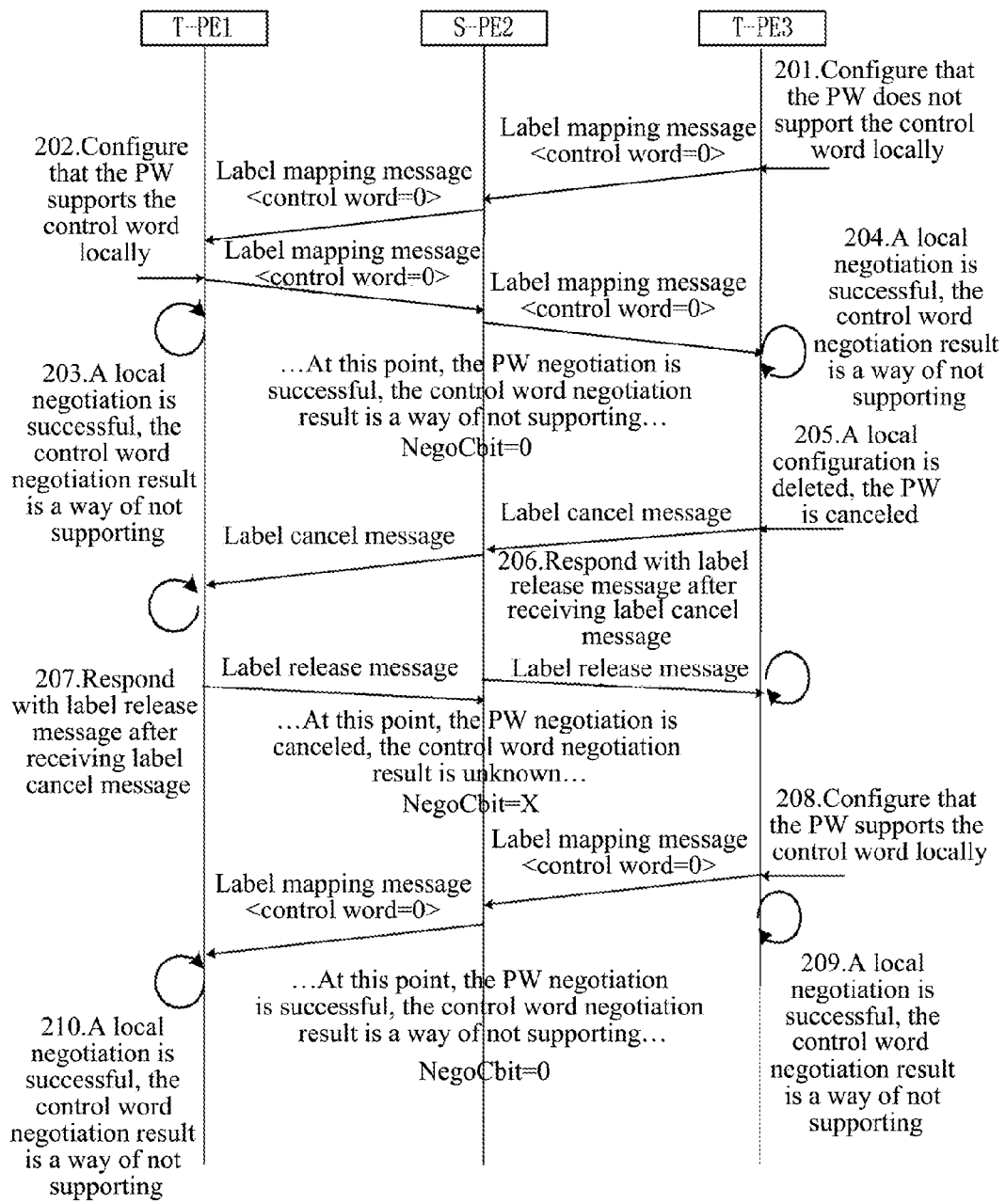
FIG. 2 is a schematic diagram of a network of the multiple segment pseudo wire control word negotiation in the related art.

According to the example of the present document, a system for implementing a pseudo wire control word capability negotiation includes a provider edge and an opposite terminal provider edge, wherein, the provider edge is configured to: when modifying a local control word value, acquire a control word value configured or negotiated locally by the opposite terminal provider edge by sending label request message and receiving label mapping message, and according to the local control word value and the acquired control word value configured or negotiated locally by the opposite terminal provider edge, determine a control word value of the pseudo wire.

When the provider edge modifies the local control word value, an implementation way of acquiring the control word value configured by the opposite terminal provider edge through the label request message and the label mapping message can be any one of the following ways.

In a way 1, the provider edge is further configured to: when modifying the local control word value, send label request message to the opposite terminal provider edge in a pseudo wire negotiation process. The opposite terminal provider edge is further configured to: after receiving the label request message, send label mapping message carrying a locally configured control word value to the provider edge, and the control word value in the label mapping message only depends on a control word value configured locally by the opposite terminal provider edge at present with respect to the pseudo wire negotiation process.

In a way 2, the provider edge is further configured to: when modifying the local control word value, firstly send label mapping message carrying a locally configured control word value to the opposite terminal provider edge in the pseudo wire negotiation process, and then send label request message to the opposite terminal provider edge. The opposite terminal provider edge is further configured to: after receiving the label request message, send label mapping message carrying a locally negotiated control word value to the provider edge. In addition, this control word value only depends on a control word value negotiated by the opposite terminal provider edge with respect to the pseudo wire.

In the way 1, the provider edge is further configured to: after determining the control word value of the pseudo wire, send label mapping message to the opposite terminal provider edge, and carry a control word value locally negotiated by the provider edge in the label mapping message.

In the way 1 and the way 2, the opposite terminal provider edge is further configured to: according to the control word value configured by this opposite terminal provider edge and the control word value carried in the received label mapping message sent by the provider edge, determine the control word value of the pseudo wire, and complete a pseudo wire control word negotiation process.

In the system, in a multiple segment pseudo wire negotiation process, after receiving label request message sent by the provider edge at a terminal, a pseudo wire switching provider edge sends the label request message to the provider edge at another terminal.

According to the example of the present document, a method for implementing a pseudo wire control word capability negotiation includes: when modifying a local control word value, a provider edge acquiring a control word value configured or negotiated locally by an opposite terminal provider edge by sending label request message and receiving label mapping message, and according to the local control word value and the acquired control word value configured or negotiated locally by the opposite terminal provider edge, the provider edge determining a control word value of the pseudo wire.

When the provider edge modifies the local control word value, a way of acquiring the control word value configured by the opposite terminal provider edge by sending the label request message and receiving the label mapping message can be any one of a way 1 or a way 2 below.

In the way 1, when modifying the local control word value, the provider edge sends label request message to the opposite terminal provider edge, and after receiving the label request message, the opposite terminal provider edge sends label mapping message carrying a locally configured control word value to the provider edge; wherein, after the opposite terminal provider edge receives the label request message, the control word value carried in the label mapping message sent by the opposite terminal provider edge to the provider edge only depends on a current control word value locally configured by the opposite terminal provider edge with respect to the pseudo wire negotiation process.

In the way 2, when modifying the local control word value, the provider edge firstly sends label mapping message carrying a locally configured control word value to the opposite terminal provider edge, and then sends label request message to the opposite terminal provider edge, and after receiving the label request message, the opposite terminal provider edge sends label mapping message carrying a locally negotiated control word value to the provider edge. Wherein, after the opposite terminal provider edge receives the label request message, the control word value carried in the label mapping message sent by the opposite terminal provider edge to the provider edge only depends on a control word value negotiated by the opposite terminal provider edge with respect to the pseudo wire.

In the way 1, after determining the control word value of the pseudo wire, the provider edge sends label mapping message to the opposite terminal provider edge, and carries a control word value locally negotiated by the provider edge in the label mapping message.

In the way 1 and the way 2, according to the control word value configured by this opposite terminal provider edge and the control word value carried in the received label mapping message sent by the provider edge, the opposite terminal provider edge determines the control word value of the pseudo wire, and completes a pseudo wire control word negotiation process.

An operation of the Provider Edge (PE) modifying the local control word value triggering an operation of sending the label request message to the opposite terminal provider edge subsequently is irrelevant to whether the provider edge has received the label mapping message sent by the opposite terminal provider edge or not. That is, no matter whether the PE has received the label mapping message sent by the opposite terminal or not, as long as a local PE modifies local control word configuration properties, it is required to send the label request message to the opposite terminal PE.

Wherein, only after the local PE receives the label mapping message of the opposite terminal PE responding to the label request message, the local PE is triggered to send the label mapping message carrying a control word value negotiated by the local PE with respect to the PW to the opposite terminal PE.

The method is not only applicable to a single segment pseudo wire, but it is applicable to multiple segment pseudo wires at the same time. In a multiple segment pseudo wire negotiation process, after receiving label request message sent by the provider edge at a terminal, a pseudo wire switching provider edge sends the label request message to the provider edge at another terminal.

In the example of the present document, when the control word configuration properties of the PE are changed, the control word value of the opposite terminal is obtained timely and accurately, thereby solving the problem of inconsistency between the control word configurations and the expected negotiation results in the control word negotiation scenario.

SPECIFIC EXAMPLE 1

Figure 3:
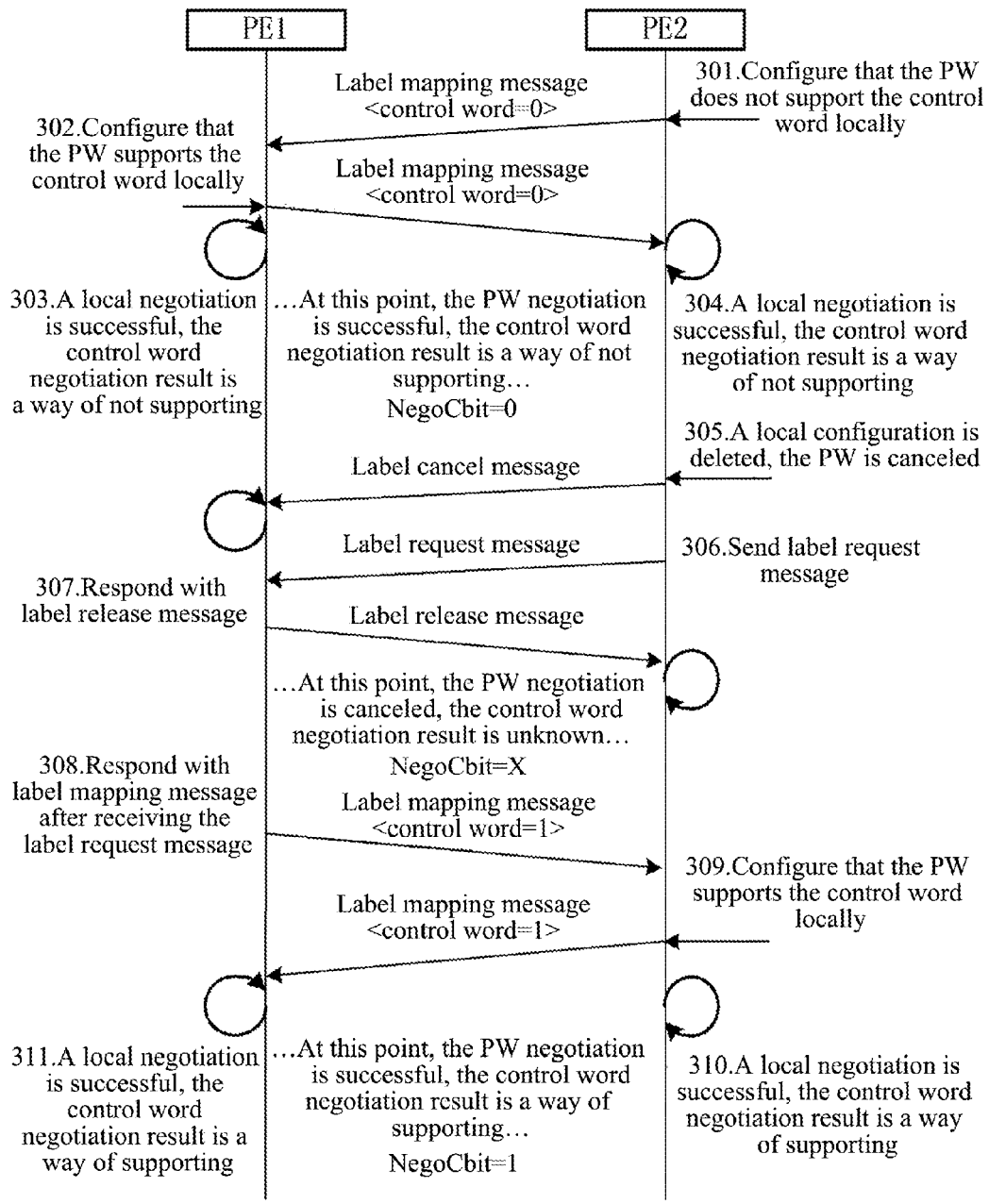
FIG. 3 is a schematic diagram of a network of the single segment pseudo wire control word negotiation in the example 1 of the present document.

FIG. 3 illustrates a schematic diagram of a network of the SS-PW control word negotiation. As shown in FIG. 3, the method for negotiating the pseudo wire control word capability in the example includes the following steps.

The steps 301 to 305 are correspondingly identical with the steps 101 to 105.

In step 306, the configuration of the PE2 is changed, and the label request message is sent to the PE1.

In this step, since the configuration of the PE2 is changed, no matter whether the PE2 has received the label mapping message carrying the C-Bit information sent from the PE1 before or not, the label request message is still sent to the PE1.

In step 307, the PE1 receives label cancel message of the PE2, a remote terminal PW is canceled, and label release message is replied to the PE2.

In step 308, after the PE1 receives the label request message of the PE2, the PE1 responds with label mapping message carrying a C-Bit of 1 to the PE2.

In this step, the PE2 sends the label request message to the PE1, the PE1 responds with label mapping message carrying a C-Bit, and a value of the C-Bit carried here is a control word value configured locally by the PE1 at present.

In step 309, the PE2 reconfigures that the PW locally supports the control word, and sends the label mapping message carrying the C-Bit of 1 to the PE1.

According to the RFC4447, if the C-Bit in the label mapping message announced from the opposite terminal is 1, it is indicated that the opposite terminal supports the control word, and if the local configuration supports the control word subsequently, the label mapping message with the C-Bit of 1 is announced to the opposite terminal. Therefore, the PE2 sends the label mapping message carrying the C-Bit of 1 to the PE1 here.

This step can only be executed after the step 308 is completed. That is, only after the PE2 reconfigures that the PW locally supports the control word and the PE2 receives the label mapping message (responding to the label request message sent by the PE1 to the PE2) responded by the PE1, the PE2 is triggered to send the label mapping message carrying the control word to the PE1.

In step 310, the PE2 makes a successful local negotiation with respect to the PW, and the control word negotiation result is a way of supporting.

In step 311, after receiving the label mapping message carrying the C-Bit of 1 announced from the PE2, the PE1 makes a successful local negotiation with respect to the PW, and the control word negotiation result is a way of supporting.

SPECIFIC EXAMPLE 2

Figure 4:
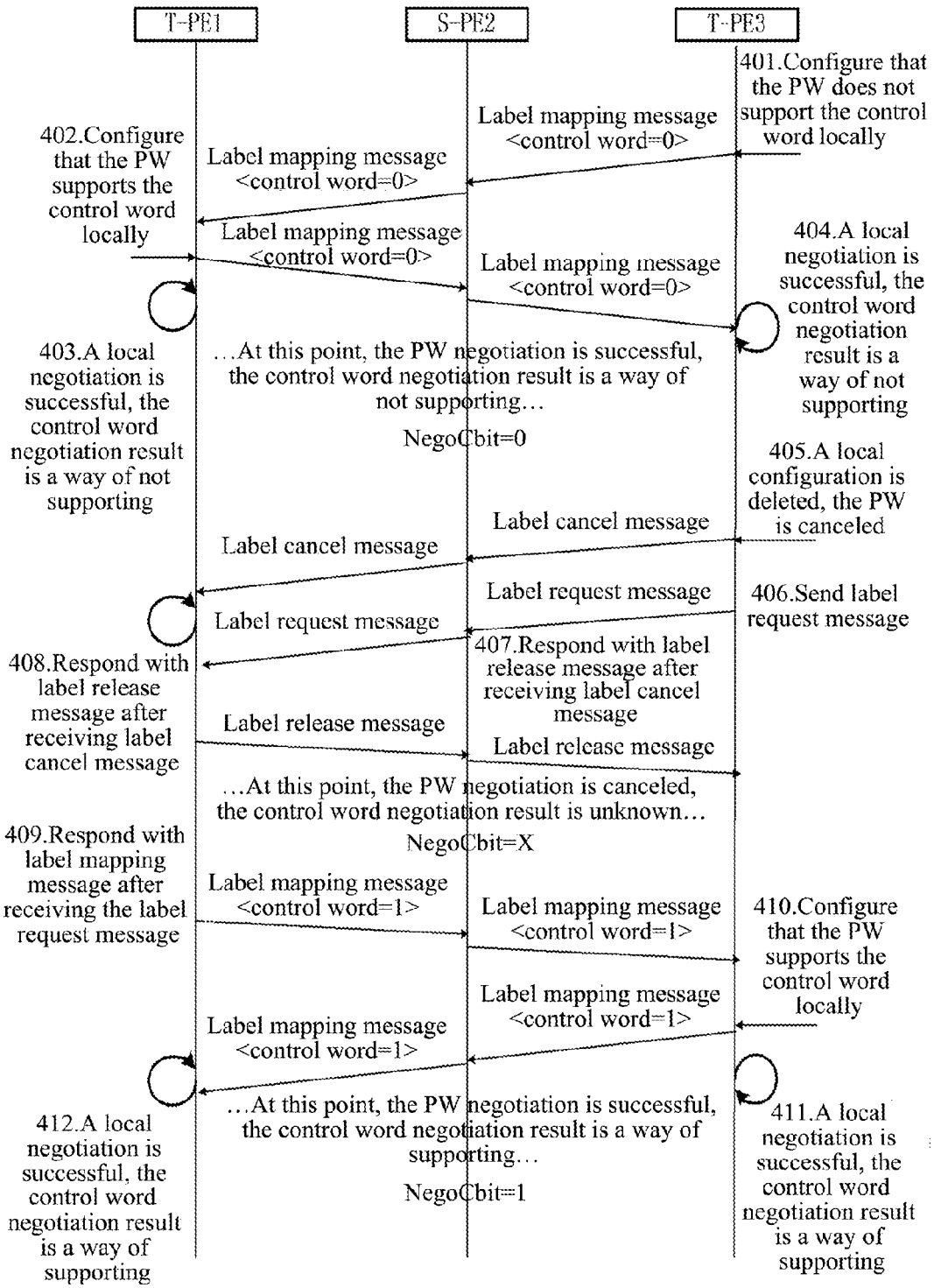
FIG. 4 is a schematic diagram of a network of the multiple segment pseudo wire control word negotiation in the example 2 of the present document.

FIG. 4 illustrates a schematic diagram of a network of the MS-PW control word negotiation. The S-PE2 can support a configuration of a control word, and it also can not support the configuration of the control word. In the example, it is assumed that the S-PE2 supports the configuration of the control word and configures that the PW locally supports the control word. As shown in FIG. 4, the method for negotiating the pseudo wire control word capability in the example includes the following steps.

The steps 401 to 405 are correspondingly identical with the steps 201 to 205.

In step 406, the configuration of the T-PE3 is changed, the label request message is sent to the S-PE2, and the S-PE2 continues to send the label request message to the T-PE1.

Here, the label request message is sent in order, only when the S-PE2 receives the label request message of the T-PE3, the S-PE2 continues to send the label request message to the T-PE1. Moreover, since the configuration of the T-PE3 is changed, no matter whether the T-PE3 has received the label mapping message carrying the C-Bit information sent from the S-PE2 before or not, the label request message is still sent to the S-PE2.

In step 407, the S-PE2 receives a label cancel message of the T-PE3 and responds with label release message to the T-PE3, and the S-PE2 continues to send the label release message to the T-PE1.

Since the label cancel message and the label release message appear in pairs, as long as the label cancel message is received, the label release message is replied; and only after receiving the label release message, the PE can resend the mapping message.

In step 408, the T-PE1 receives the label cancel message of the S-PE2, and responds with the label release message to the S-PE2.

In step 409, after the T-PE1 receives the label request message of the S-PE2, the T-PE1 responds with label mapping message carrying a C-Bit of 1 to the S-PE2, since the local configuration of the S-PE2 supports the control word at the point, the S-PE2 sends the label mapping message carrying the C-Bit of 1 to the T-PE3.

Here, since the S-PE2 sends the label request message to the T-PE1 in step 406, the T-PE1 responds with label mapping message carrying a C-Bit, and a value of the C-Bit included here is a control word value configured locally by the T-PE1 at present; the S-PE2 will not send the label mapping message initiatively, and only after receiving label mapping message, the S-PE2 is triggered to send the label mapping message to the T-PE3.

In step 410, the T-PE3 reconfigures that the PW locally supports the control word, and sends the label mapping message carrying the C-Bit of 1 to the S-PE2.

According to the provision of RFC4447, if the C-Bit in the label mapping message announced from the opposite terminal is 1, it is indicated that the opposite terminal supports the control word, and if the local configuration supports the control word subsequently, the label mapping message with the C-Bit of 1 is announced to the opposite terminal. Therefore, the T-PE3 sends the label mapping message carrying the C-Bit of 1 to the S-PE2 here.

This step can only be executed after the step 409 is completed. That is, only after the T-PE3 reconfigures that the PW locally supports the control word and the T-PE3 receives the label mapping message (responding to the label request message sent by the T-PE3 to the S-PE2) responded by the S-PE2, the T-PE3 is triggered to send the label mapping message carrying the control word to the S-PE2.

In step 411, the T-PE3 makes a successful local negotiation with respect to the PW, and the control word negotiation result is a way of supporting.

In step 412, after receiving the label mapping message carrying the C-Bit of 1 announced from the S-PE2, the T-PE1 makes a successful local negotiation with respect to the PW, and the control word negotiation result is a way of supporting.

SPECIFIC EXAMPLE 3

Figure 5:
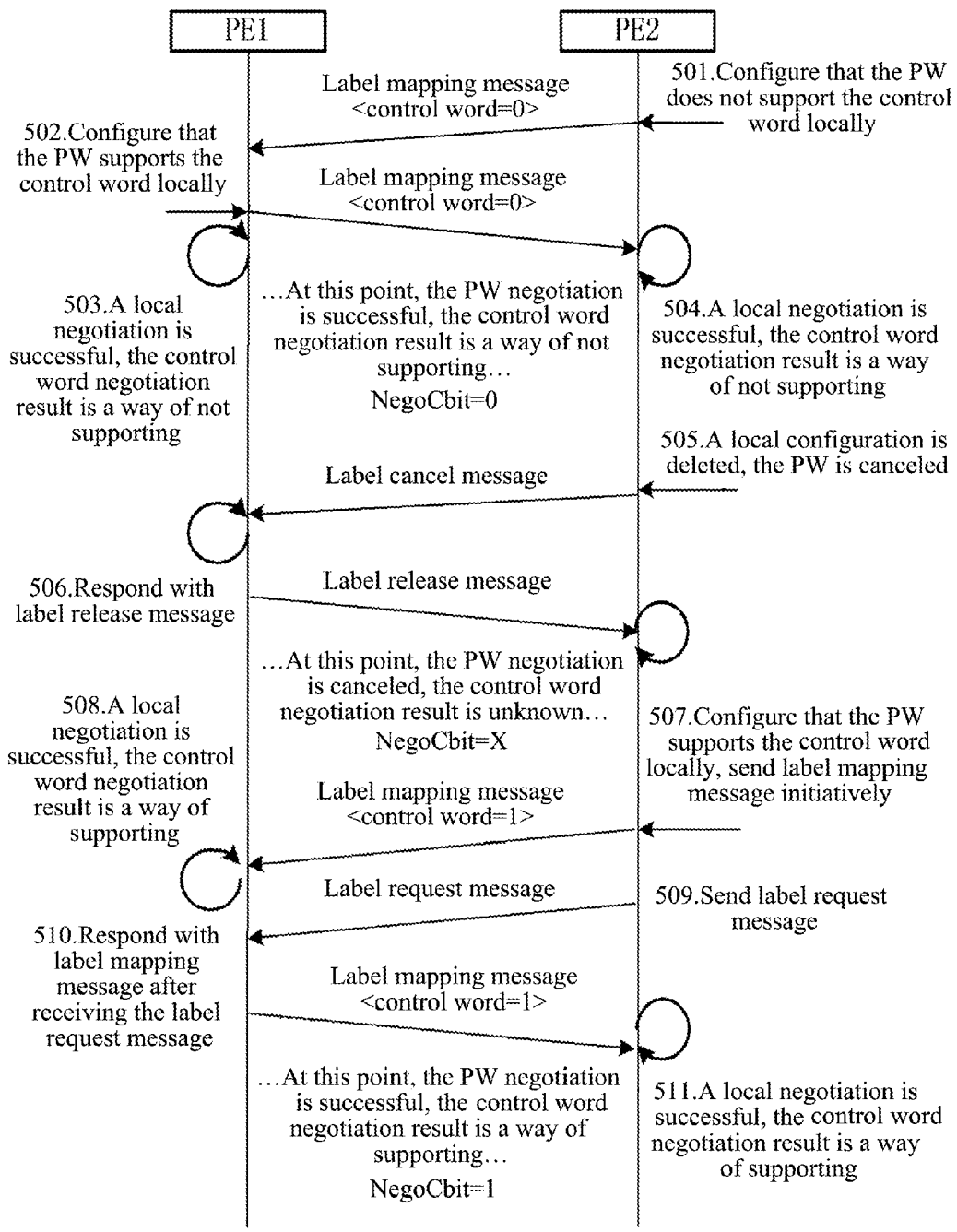
FIG. 5 is a schematic diagram of a network of the single segment pseudo wire control word negotiation in the example 3 of the present document.

FIG. 5 illustrates a schematic diagram of a network of the SS-PW control word negotiation. As shown in FIG. 5, the method for negotiating the pseudo wire control word capability in the example includes the following steps.

The steps 501 to 506 are correspondingly identical with the steps 101 to 106.

In step 507, the PE2 reconfigures that the PW locally supports the control word, and the PE2 initiatively sends the label mapping message carrying the C-Bit of 1 to the PE1.

In this step, since the PE2 reconfigures that the PW locally supports the control word, the PE2 will send label mapping message carrying a current local configuration to the PE1.

In step 508, after receiving the label mapping message carrying the C-Bit of 1 announced from the PE2, the PE1 makes a successful local negotiation with respect to the PW, and the control word negotiation result is a way of supporting.

In step 509, the PE2 sends label request message to the PE1.

In this step, since the PE2 reconfigures a control word value, no matter whether the PE2 has received the label mapping message carrying the C-Bit information sent from the PE1 before or not, the label request message is still sent to the PE1.

In step 510, after the PE1 receives the label request message of the PE2, the PE1 responds with label mapping message carrying a C-Bit of 1 to the PE2.

According to the RFC4447, if the C-Bit in the label mapping message announced from the opposite terminal is 1, it is indicated that the opposite terminal supports the control word, and if the locally configured control word value is supported subsequently, the label mapping message with the C-Bit of 1 is announced to the opposite terminal, and this step can only be executed after the step 509 is completed. That is, only after the PE1 receives the label request message sent by the PE2, the PE2 is triggered to send the label mapping message to the PE1. Therefore, the PE1 responds with the label mapping message carrying the C-Bit of 1 to the PE2 here. A value of the C-Bit carried here is a control word value negotiated locally by the PE1 at present.

In step 511, the PE2 makes a successful local negotiation with respect to the PW, and the control word negotiation result is a way of supporting.

SPECIFIC EXAMPLE 4

Figure 6:
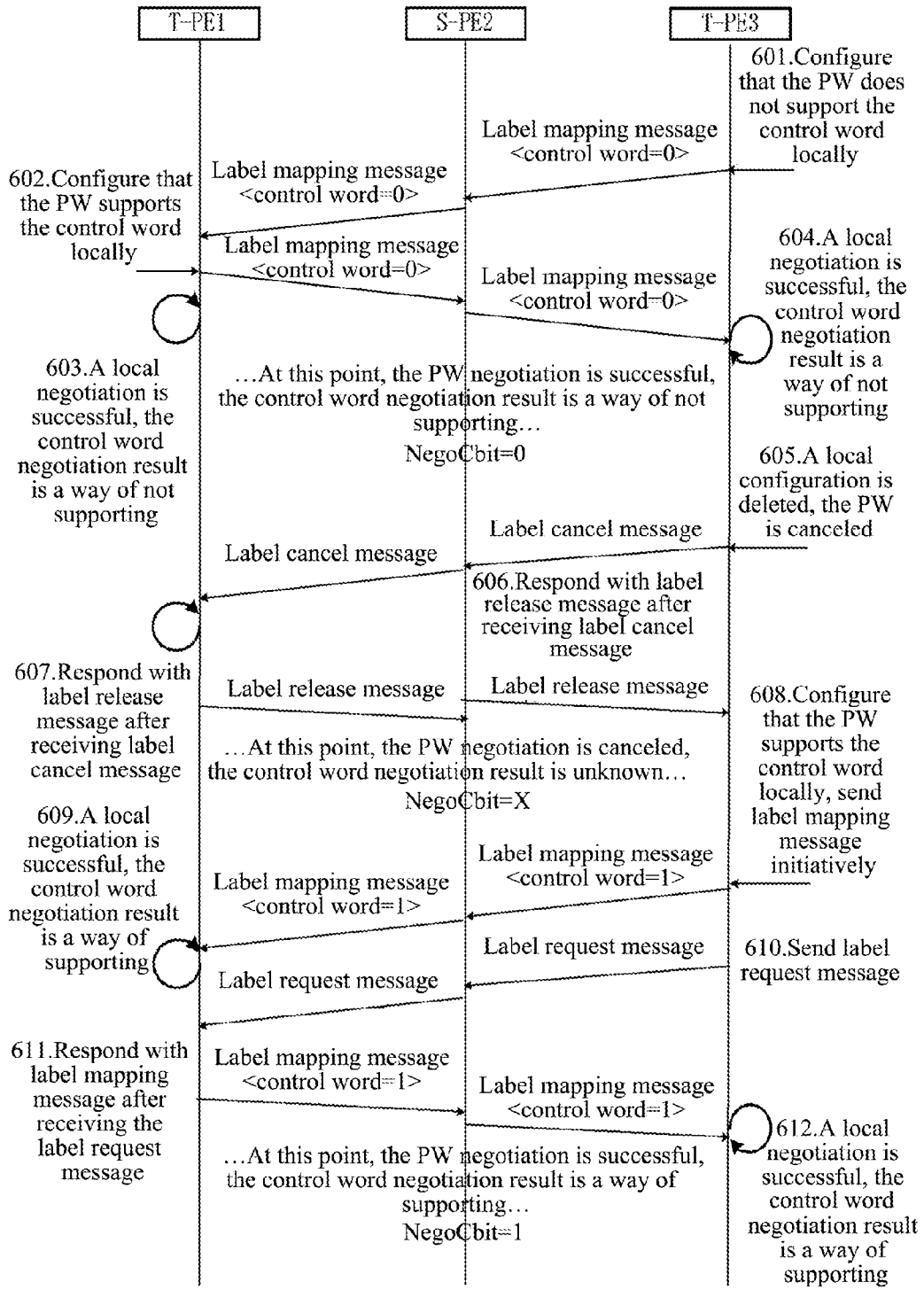
FIG. 6 is a schematic diagram of a network of the multiple segment pseudo wire control word negotiation in the example 4 of the present document.

FIG. 6 illustrates a schematic diagram of a network of the MS-PW control word negotiation. The S-PE2 can support a configuration of a control word, and it also can not support the configuration of the control word. In the example, it is assumed that the S-PE2 supports the configuration of the control word and configures that the PW locally supports the control word. As shown in FIG. 6, the method for negotiating the pseudo wire control word capability in the example includes the following steps.

The steps 601 to 607 are correspondingly identical with the steps 201 to 207.

In step 608, the T-PE3 reconfigures that the PW locally supports the control word, and the T-PE3 initiatively sends the label mapping message carrying the C-Bit of 1 to the S-PE2.

In this step, since the T-PE3 reconfigures that the PW locally supports the control word, the T-PE3 will send label mapping message carrying a current local configuration to the S-PE2.

In step 609, after receiving the label mapping message carrying the C-Bit of 1 announced from the S-PE2, the T-PE1 makes a successful local negotiation with respect to the PW, and the control word negotiation result is a way of supporting.

In step 610, the T-PE3 sends label request message to the S-PE2, and the S-PE2 continues to send the label request message to the T-PE1.

In this step, since the T-PE3 reconfigures a control word value, no matter whether the T-PE3 has received the label mapping message carrying the C-Bit information sent from the S-PE2 before or not, the label request message is still sent to the S-PE2.

Here, the label request message is sent in order, only when the S-PE2 receives the label request message of the T-PE3, the S-PE2 continues to send the label request message to the T-PE1. Moreover, since the configuration of the T-PE3 is changed, no matter whether the T-PE3 has received the label mapping message carrying the C-Bit information sent from the S-PE2 before or not, the label request message is still sent to the S-PE2.

In step 611, after the T-PE1 receives the label request message of the S-PE2, the T-PE1 responds with label mapping message carrying a C-Bit of 1 to the S-PE2, since the local configuration of the S-PE2 is supporting the control word at the point, the S-PE2 sends label mapping message carrying the C-Bit of 1 to the T-PE3.

Here, since the S-PE2 sends the label request message to the T-PE1 in step 610, the T-PE1 responds with label mapping message, and a value of the C-Bit carried in the label mapping message here is a control word value negotiated locally by the T-PE1; the S-PE2 will not send the label mapping message initiatively, and only after receiving label mapping message, the S-PE2 is triggered to send the label mapping message to the T-PE3.

According to the provision of RFC4447, if the C-Bit in the label mapping message announced from the opposite terminal is 1, it is indicated that the opposite terminal supports the control word, and if the locally configured control word value is supported subsequently, the label mapping message with the C-Bit of 1 is announced to the opposite terminal, and this step can only be executed after the step 610 is completed. That is, only after the T-PE3 receives the label request message sent by the S-PE2, the T-PE3 is triggered to send the label mapping message carrying the control word to the S-PE2. Therefore, the T-PE1 responds with the label mapping message carrying the C-Bit of 1 to the S-PE2 here.

In step 612, the T-PE3 makes a successful local negotiation with respect to the PW, and the control word negotiation result is a way of supporting.

Certainly, the present document can still have other various examples, the skilled familiar to the art can make various corresponding changes and transformations according to the present document without departing from the spirit and essence of the present document, however, these corresponding changes and transformations shall all fall into the protection scope of the appended claims of the present document.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

INDUSTRIAL APPLICABILITY

In the present document, the problem of inconsistency between the control word configurations and the expected negotiation results existing in certain specific scenarios is solved, which enhances the negotiation performance. The technical scheme of the present document is easy to implement, it makes slight modifications on the existing protocol, and it is applicable to a single segment pseudo wire scenario and a multiple segment pseudo wire scenario, which has lower implementation costs, thereby having an extremely strong industrial applicability.

What is claimed is:

1. A method for implementing a pseudo wire control word capability negotiation, comprising:
   when a locally configured control word value of a pseudo wire of a provider edge is changed, the provider edge acquiring a control word value configured locally or negotiated locally by an opposite provider edge by sending label request message and receiving label mapping message,
   and the provider edge determining a control word value negotiated with respect to the pseudo wire according to the locally configured control word value of the provider edge and the acquired control word value acquired from the opposite provider edge.

2. The method according to claim 1, wherein, the step of when the locally configured control word value of the pseudo wire of a provider edge is changed, the provider edge acquiring a control word value configured by an opposite provider edge by sending label request message and receiving label mapping message comprises any one of following ways:
   a way 1, when the locally configured control word value of the pseudo wire is changed, the provider edge sending label request message to the opposite provider edge, and after receiving the label request message, the opposite provider edge sending label mapping message carrying a locally configured control word value to the provider edge;
   a way 2, when the locally configured control word value of the pseudo wire is changed, the provider edge firstly sending label mapping message carrying a locally configured control word value to the opposite provider edge, and then sending label request message to the opposite provider edge, and after receiving the label request message, the opposite provider edge sending label mapping message carrying a locally negotiated control word value to the provider edge.

3. The method according to claim 2, further comprising:
in the way 1, after determining the control word value negotiated with respect to the pseudo wire, the provider edge sending label mapping message to the opposite provider edge, and carrying a control word value locally negotiated by the provider edge in the label mapping message.

4. The method according to claim 1, further comprising:
according to the control word value configured locally and the control word value carried in the received label mapping message sent by the provider edge, the opposite provider edge determining the control word value negotiated with respect to the pseudo wire, and completing a pseudo wire control word negotiation process.

5. The method according to claim 2, wherein, an operation of the provider edge modifying the local control word value of the pseudo wire triggering an operation of sending the label request message to the opposite provider edge subsequently is irrelevant to whether the provider edge has received the label mapping message sent by the opposite provider edge or not.

6. The method according to claim 1, further comprising:
in a multiple segment pseudo wire negotiation process, after receiving label request message sent by the provider edge at a terminal side, a pseudo wire switching provider edge sending the label request message to the provider edge at another terminal side.

7. A system for implementing a pseudo wire control word capability negotiation, comprising: a provider edge and an opposite provider edge, wherein,
the provider edge is configured to: when a locally configured control word value of a pseudo wire of the provider edge is changed, acquire a control word value configured or negotiated locally by the opposite provider edge by sending label request message and receiving label mapping message, and determine a control word value negotiated with respect to the pseudo wire according to the locally configured control word value and the acquired control word value acquired from opposite provider edge.

8. The system according to claim 7, wherein,
the provider edge is further configured to: when the locally configured control word value of the pseudo wire is changed, send label request message to the opposite provider edge in a pseudo wire negotiation process;
the opposite provider edge is configured to: after receiving the label request message, send label mapping message carrying a locally configured control word value to the provider edge, wherein, the control word value in the label mapping message only depends on a control word value locally configured by the opposite provider edge.

9. The system according to claim 7, wherein,
the provider edge is further configured to: when the locally configured control word value of the pseudo wire is changed, firstly send label mapping message carrying a locally configured control word value to the opposite provider edge in the pseudo wire negotiation process, and then send label request message to the opposite provider edge;
the opposite provider edge is configured to: after receiving the label request message, sending label mapping message carrying a locally negotiated control word value to the provider edge, wherein, the control word value in the label mapping message only depends on a control word value locally negotiated by the opposite provider edge.

10. The system according to claim 7, wherein,
the provider edge is further configured to: after determining a control word value locally negotiated with respect to the pseudo wire, send label mapping message to the opposite provider edge, and carry a control word value locally negotiated by the provider edge in the label mapping message.

11. The system according to claim 7, wherein,
the opposite provider edge is further configured to: according to the control word value configured locally and the control word value carried in the received label mapping message sent by the provider edge, determine the control word value negotiated with respect to the pseudo wire, and complete a pseudo wire control word negotiation process.

12. The system according to claim 7, further comprising a pseudo wire switching provider edge, wherein,
the pseudo wire switching provider edge is configured to: after receiving label request message sent by the provider edge at a terminal side, send the label request message to the provider edge at another terminal side.

13. A provider edge comprising at least one processor configured to perform a label request message sending module, a label mapping message receiving module and a control word value determination module, wherein:
when a locally configured control word value of a pseudo wire is changed, by the label request message sending module sending label request message and the label mapping message receiving module receiving label mapping message, the provider edge acquires a control word value locally configured by an opposite provider edge or negotiated by an opposite provider edge with respect to the pseudo wire in a pseudo wire negotiation process;
the control word value determination module is configured to: determine the control word value negotiated with respect to the pseudo wire according to the locally configured control word value of the provider edge and the acquired control word value.

14. The provider edge according to claim 13, wherein,
the label request message sending module is further configured to: when the locally configured control word value of the pseudo wire is changed, send label request message to the opposite provider edge in the pseudo wire negotiation process;
the label mapping message receiving module is further configured to: receive label mapping message carrying a locally configured control word value sent by the opposite provider edge in the pseudo wire negotiation process, wherein, the control word value in the label mapping message only depends on a control word value locally configured by the opposite provider edge in the pseudo wire negotiation process.

15. The provider edge according to claim 14, further comprising a label mapping message sending module performed by the processor, wherein,
the label mapping message sending module is configured to: after determining a control word value locally negotiated by the provider edge with respect to the pseudo wire, send label mapping message to the opposite provider edge in the pseudo wire negotiation process, and carry the control word value negotiated by the provider edge with respect to the pseudo wire in the label mapping message.

16. The provider edge according to claim 13, further comprising a label mapping message sending module performed by the processor, wherein:

the label mapping message sending module is configured to: when modifying the locally configured control word value of the pseudo wire is changed, send label mapping message carrying a locally configured control word value to the opposite provider edge in the pseudo wire negotiation process;

the label request message sending module is further configured to: after the label mapping message sending module sends the label mapping message carrying the locally configured control word value to the opposite provider edge in the pseudo wire negotiation process, send label request message to the opposite provider edge in the pseudo wire negotiation process;

the label mapping message receiving module is further configured to: receive the label mapping message carrying the locally negotiated control word value sent by the opposite provider edge in the pseudo wire negotiation process, wherein, the control word value in the label mapping message only depends on a control word value negotiated by the opposite provider edge with respect to the pseudo wire in the pseudo wire negotiation process.

* * * * *